Nov. 17, 1925.
A. GREENSPAN
METHOD OF PURIFYING HYDROCARBONS
Filed Nov. 10, 1922
1,562,425
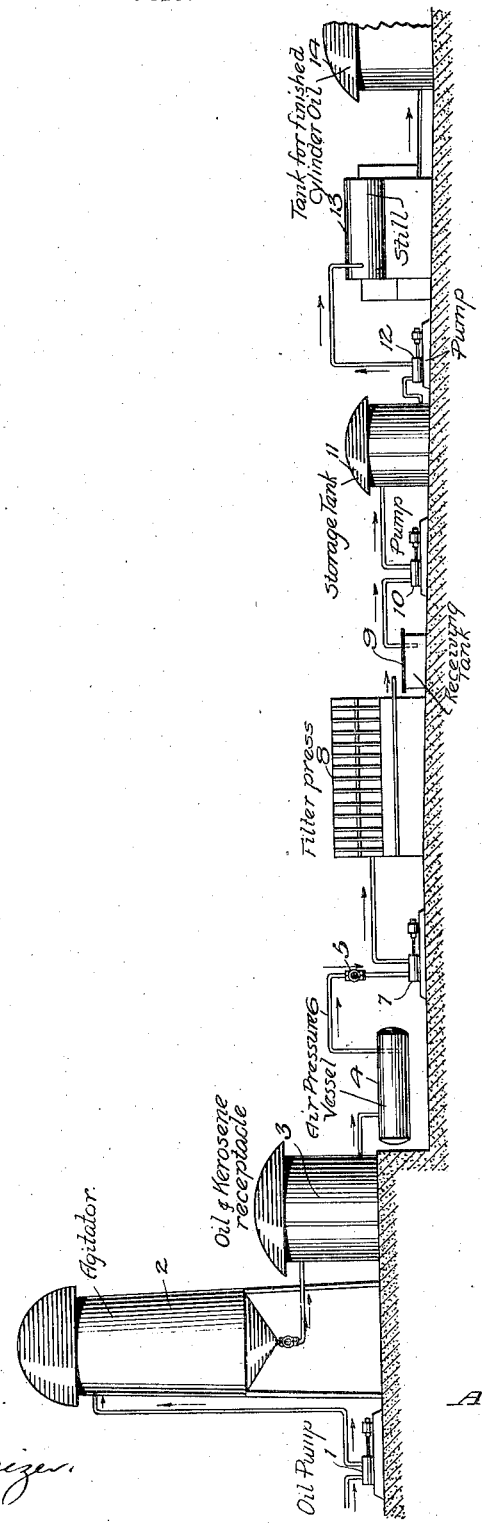
WITNESSES
INVENTOR
Adolf Greenspan
BY
ATTORNEYS Patented Nov. 17, 1925.

1,562,425

UNITED STATES PATENT OFFICE.

ADOLPH GREENSPAN, OF MINATITLAN, VERA CRUZ, MEXICO.

METHOD OF PURIFYING HYDROCARBONS.

Application filed November 10, 1922. Serial No. 600,006.

*To all whom it may concern:*

Be it known that I, ADOLPH GREENSPAN, a citizen of the Republic of Poland, and a resident of Minatitlan, in the State of Vera Cruz, Mexico, have invented a new and Improved Method of Purifying Hydrocarbons, of which the following is a full, clear, and exact description.

The object of the process hereinafter described relates to a method by which hydrocarbons resulting from the distillation of crude oil, or other hydrocarbons containing wax, can be freed from this wax.

The present methods employed for the treatment of such oils consist in subjecting the aforesaid distillates to a low temperature and separating the wax from the oil by passing the cold oil through filter presses, but the application of this process pre-supposes that all of the wax will be in a crystalline modification.

If the wax is contained in these hydrocarbons in an amorphous condition, as, for instance, in the residuum obtained by the distillation of crude oil of paraffin base, the oil is diluted with more than its own volume of gasoline and subjected to the freezing process and the wax separated by settling, or by aid of centrifuge.

In the event, however, that the oil to be subjected to treatment contains a mixture of crystalline wax and amorphous wax, neither process can be successfully applied.

Now, I have found that I can accomplish the separation of oil from wax when the latter is contained in the oil in a combined crystalline and amorphous state, by first removing the crystalline and then the amorphous wax.

I have discovered that the crystalline wax can be segregated from the oil if the heavy, viscous oil is allowed to settle at a temperature at which no separation of amorphous wax can occur, and that once the crystalline wax has been separated from the heavy oil, the amorphous wax can be removed by distillation.

The following procedure may be well employed in order to carry the invention into effect in a form which embodies, by way of example, all of the improvements which compose said invention, but it must be clearly understood that my invention is not limited to the class of oil as described hereinafter, and that it can be applied similarly to any hydrocarbons of whatever origin when the wax is contained in the oil in a combined amorphous and crystalline state.

A heavy, viscous oil of a viscosity of 70 seconds measured in the Saybolt viscosimeter at 212° F., is treated in the usual manner with sulphuric acid and alkali to remove those impurities which can be removed by this known process. It is then allowed to settle at a temperature of 80° to 90° F. After the temperature of the oil is uniform, it is then diluted by 15 to 20% of its volume of kerosene. The kerosene is added gradually and slowly incorporated with the oil so as not to destroy the germs of crystalline wax already formed in the original oil. In a short time the crystals begin to grow and to separate from the oil. After the state of equilibrium has been reached, the oil is passed through a filter press, but care must be taken not to destroy the crystals by unnecessary motion. Any other known means may be used for the separation of the crystals from the liquid. The filtrate obtained in this process is collected and distilled by the application of heat and steam until the residuum in the still is free from amorphous wax. The residuum thus obtained is a high-grade cylinder stock of a viscosity, as measured in the Saybolt viscosimeter at a temperature of 212° F., of between 130 and 200 seconds, and with a very satisfactory pour point of less than 32° F.

The accompanying drawing illustrates, by way of example, one form of apparatus which can be used for carrying out the aforesaid invention.

Figure 1 is a pump which delivers the oil to agitator 2 from which the treated oil is drawn into the receptacle 3 in which the oil is allowed to attain a uniform temperature, and is filled with oil to such height that kerosene to the amount of 15 to 20% of the volume of the oil can be added.

Figure 4 is an air pipe connected to a blower which supplies air under low pressure.

Figure 5 is a shut-off valve connected to a pipe 6 which leads to a pump 7 connected with a filter press 8; the pump preferably to be a high-pressure pump capable of supplying the oil under a pressure of 200 pounds, or more, per square inch.

Figure 9 is a receptacle for the filtered oil which is delivered by a pump 10 to a storage tank 11. 12 is a pump which takes the oil from the tank 11 to a still 13, which still is used for the said purpose of distilling the oil by the aid of steam and or vacuum. 14 is a tank to receive the finished oil.

I have described my process as a matter of practice rather than of theory, but it allows me to obtain from certain oils, that have hitherto been considered waste, a useful and valuable product. It is apparent that the invention may likewise be applied to oils of other origin than from crude oil and whether they are derived from crude oil by distillation or other means, as evaporation and concentration, and, although my invention has hereinbefore been described with a specific example of its application, it is not intended that the details presented are to be regarded as limitations upon the scope of the invention, except in so far as included in the accompanying claim.

What I claim is:

A process of removing crystalline and amorphous wax from oil which consists in first causing crystallization of the crystalline wax at a temperature of between 80 and 90 degrees Fahrenheit by the addition of 15 to 20 per cent of kerosene, then mechanically separating the oil from the wax crystals, and then distilling off amorphous wax and kerosene from the separated oil until the residuum in the still is a high grade cylinder stock, substantially as described.

ADOLPH GREENSPAN.